United States Patent
Roll et al.

(10) Patent No.: US 7,360,811 B2
(45) Date of Patent: Apr. 22, 2008

(54) BUMPER FOR A MOTOR VEHICLE

(75) Inventors: Michael Roll, Bielefeld (DE); Ulrich Lütke-Bexten, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/425,849

(22) Filed: Jun. 22, 2006

(65) Prior Publication Data

US 2006/0290149 A1 Dec. 28, 2006

(30) Foreign Application Priority Data

Jun. 24, 2005 (DE) .................. 10 2005 029 726

(51) Int. Cl.
*B60R 19/34* (2006.01)
(52) U.S. Cl. .................. 293/133; 293/132; 293/155
(58) Field of Classification Search ............. 293/133, 293/155, 132, 102, 120; 296/203.02
See application file for complete search history.

(56) References Cited

U.S. PATENT DOCUMENTS

| 6,299,226 | B1* | 10/2001 | Kroning et al. ............. 293/120 |
| 6,439,650 | B2* | 8/2002 | Artner et al. ............... 293/102 |
| 6,474,709 | B2* | 11/2002 | Artner ......................... 293/133 |
| 6,520,552 | B2 | 2/2003 | Schröter et al. |
| 6,595,502 | B2* | 7/2003 | Koch et al. .................. 293/133 |
| 6,648,385 | B2* | 11/2003 | Frank ........................... 293/133 |
| 6,863,321 | B2* | 3/2005 | Jonsson et al. ............. 293/102 |
| 6,893,063 | B2* | 5/2005 | Harrison et al. ............ 293/133 |
| 7,066,509 | B2* | 6/2006 | Kollaritsch et al. ......... 293/133 |
| 7,077,442 | B2* | 7/2006 | Arns ............................ 293/155 |
| 7,188,877 | B2* | 3/2007 | Gonzalez et al. ........... 293/133 |
| 7,201,413 | B2* | 4/2007 | Hillekes et al. ............. 293/133 |
| 7,213,867 | B2* | 5/2007 | Haneda et al. .............. 296/132 |
| 7,252,314 | B2* | 8/2007 | Tamura et al. .............. 293/133 |
| 2003/0218341 | A1* | 11/2003 | Jonsson et al. ............. 293/102 |
| 2005/0016807 | A1* | 1/2005 | Braymand ................... 188/371 |
| 2005/0104392 | A1* | 5/2005 | Leibhard et al. ............ 293/132 |
| 2006/0125254 | A1* | 6/2006 | Arns et al. ................... 293/155 |
| 2006/0290150 | A1* | 12/2006 | Roll et al. ................... 293/133 |
| 2007/0040398 | A1* | 2/2007 | Lutke-Bexten et al. ..... 293/102 |
| 2007/0182176 | A1* | 8/2007 | Muskos ....................... 293/133 |
| 2007/0222239 | A1* | 9/2007 | Arns ............................ 293/132 |

FOREIGN PATENT DOCUMENTS

DE 100 14 469 A1 10/2001

* cited by examiner

*Primary Examiner*—Kiran B. Patel
(74) *Attorney, Agent, or Firm*—Henry M. Feiereisen; Ursula B. Day

(57) ABSTRACT

A bumper for a motor vehicle includes a cross member which is disposed transversely to a side rail of a motor vehicle frame, and a crash box which is connected between the side rails and the cross member. The crash box is configured in fold construction from a metal sheet and has a sidewall which exhibits a roof-shaped structure. The sidewall includes at least one wall section which is inclined in relation to the horizontal midsection transverse plane of the crash box.

7 Claims, 1 Drawing Sheet

BUMPER FOR A MOTOR VEHICLE

CROSS-REFERENCES TO RELATED APPLICATIONS

This application claims the priority of German Patent Application, Serial No. 10 2005 029 726.9, filed Jun. 24, 2005, pursuant to 35 U.S.C. 119(a)-(d), the content(s) of which is/are incorporated herein by reference.

BACKGROUND OF THE INVENTION

The present invention relates, in general, to a bumper for a motor vehicle.

Nothing in the following discussion of the state of the art is to be construed as an admission of prior art.

Bumpers are typically arranged across the front and rear of a motor vehicle between the plastic shell of the vehicle body and the frame of the motor vehicle. To prevent damage to the vehicle body structure in the event of a crash or impact at low speed, crash boxes are integrated to absorb energy caused by the impact and to convert the energy in deformation work.

U.S. Pat. No. 6,520,552 describes a bumper for a motor vehicle, including a cross member having a U-shaped cross section and attached to side rails of a vehicle chassis. The cross member includes a web and two legs connected to the web. Received in the cross member is a crash box which has a cross member proximal end joined to the web and to confronting ends of the legs German Offenlegungsschrift DE 100 14 469 A1 discloses a crash box for a motor vehicle in shell construction. Embossments in the crash box are intended to cause a deformation at certain areas.

Current crash boxes have been shown inadequate in the event of an impact at an angle at slow speed because the energy absorption is insufficient so that most of the impact energy is absorbed by the cross member.

It would therefore be desirable and advantageous to provide an improved vehicle bumper to obviate prior art shortcomings.

SUMMARY OF THE INVENTION

According to one aspect of the present invention, a bumper for a motor vehicle includes a cross member disposed transversely to a side rail of a motor vehicle frame, and a crash box connected to the cross member and configured in fold construction from a metal sheet, with the crash box having a sidewall configured to form a roof-shaped structure.

To ensure clarity, it is necessary to establish the definition of several important terms and expressions that will be used throughout this disclosure. The term, "roof" or "roof-shaped" is used in a generic sense and relates to any structure that projects out and spans the interior of the crash box like a roof, canopy, and like terms. The term "fold construction" relates to a shaping process by which a flat metal sheet is bent and buckled to provide a desired configuration.

As a result of its configuration, the crash box according to the invention is supported by the cross member in a fan-like manner, thereby subjecting the cross member to less stress as the crash box is responsive in a more direct way and immediately in the event of an impact at slow speed. The crash box thus contributes to a greater degree to energy absorption, in particular in the event of a side collision at slow speed.

The crash box may be made of thin-walled sheet metal in fold construction. This can be realized by beveling metal sheets. In this way, joining processes during manufacture can be minimized. The crash box may be made of single-shell construction or made of two shells, i.e. upper shell and a lower shell. In single-piece construction, joining processes are reduced to a minimum. Depending on the desired deformation behavior or capability, the crash box may be of closed configuration or may be open along on length side. In the latter case, the crash box may have a sidewall formed with a gap extending lengthwise of the crash box.

According to another feature of the present invention, the crash box is defined by a horizontal plane extending in midsection transversely to a longitudinal extension of the crash box, wherein the sidewall of the crash box may have a wall section which is inclined in relation to the horizontal plane. In this way, the sidewall receives the roof-shaped configuration. The length and angle of inclination of the wall section may vary so that the crash box can be best suited to the overall system of the bumper.

According to another feature of the present invention, the sidewall may have an upper wall section and a lower wall section, with at least one of the upper and lower wall sections being subdivided by a diagonal edge to form two distinct wall surfaces. The wall surfaces may hereby have a triangular configuration or trapezoidal configuration. The wall surfaces of the wall section can be inclined at different angles.

The crash box is supported in a fan-like manner by the cross member. According to another feature of the present invention, the crash box has a vertical cross section which may increase from a side rail proximal end to a cross member proximal end. As a consequence of the expanded support surface upon the cross member, the crash box becomes responsive quickly for absorbing energy in the event of an impact. Suitably, the sidewall of the crash box is directed to an adjacent end of the cross member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
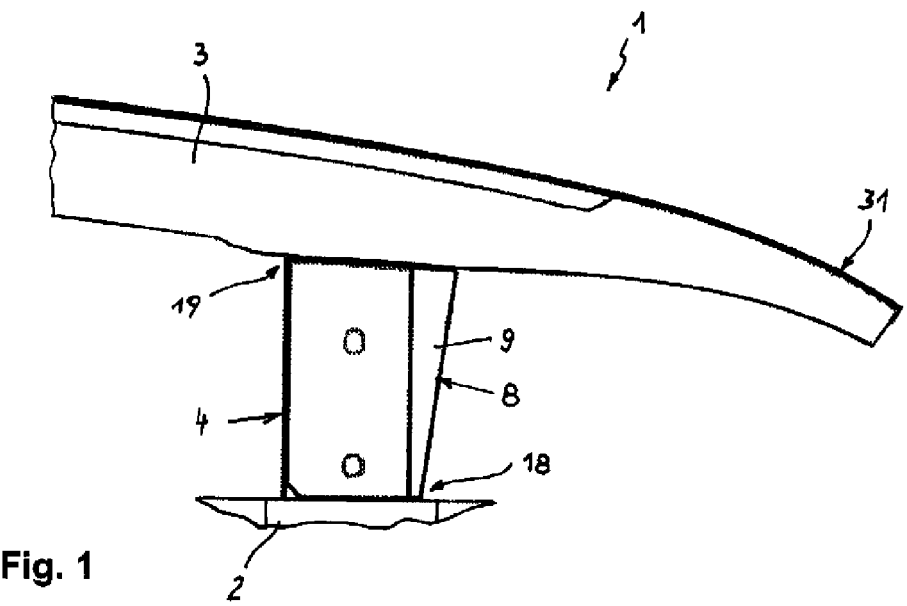
FIG. 1 is a principal plan view of a portion of a bumper according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic plan view of a portion of a bumper according to the present invention, generally designated by reference numeral 1, for a motor vehicle. The bumper 1 has a cross member 3 which extends transversely to side rails 2 of the vehicle frame which are only indicated in FIG. 1. Disposed between the side rails 2 and the cross member 3 are housing-like crash boxes 4 to form deformation elements for absorbing energy in the event of a crash. Only one crash box 4 is shown in FIG. 1, whereby sidewall 8 is depicted here by way of example as having an inclined wall section 9 in accordance with the present invention.

Figure 2:
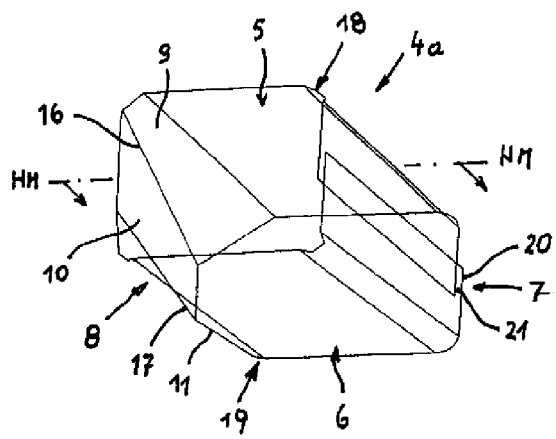
FIG. 2 is a perspective view of a first embodiment of a crash box of the bumper.
Figure 3:
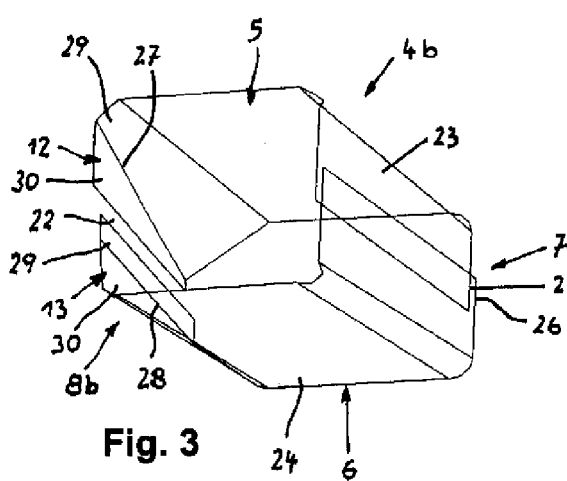
FIG. 3 is a perspective view of a second embodiment of a crash box of the bumper.
Figure 4:
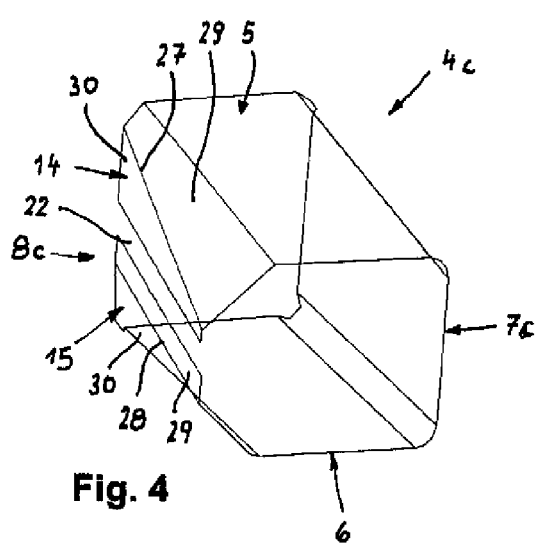
FIG. 4 is a perspective view of a third embodiment of a crash box of the bumper.

FIGS. 2 to 4 show three embodiments of a crash box 4, designated by reference numerals 4a, 4b, 4c, respectively, and made in fold construction from a thin-walled sheet metal. The crash box 4a of FIG. 2 has a closed configuration with four sidewalls 5, 6, 7, 8, whereby, as described above, one of the sidewalls, here sidewall 8 by way of example, has a roof-shaped configuration. The sidewall 8 has wall sections 9, 10, 11 which are inclined at an angle in relation to a horizontal plane HM which extends in midsection across the crash box 4a. The wall sections 9, 10, 11 are realized by forming diagonal edges 16, 17 in the sidewall 8 and define triangular or trapezoidal wall surfaces. In other words, the sidewall 8 is beveled at the diagonal edges 16, 17 which extend slantingly in lengthwise direction. At its end 18 proximal to the side rail 2, the crash box 4a has a rectangular cross section. From the side rail proximal end 18, the vertical cross section of the crash box 4a expands to the opposite end 19 which is proximal to the cross member 3.

As a result of the roof-shaped configuration of the sidewall 8, the crash box 4a expands in a fan-like manner. The crash box 4a is made from a single closed shell of sheet metal, whereby confronting ends 20, 21 of vertical sidewall 7 overlap and are welded to one another.

The crash box 4b, shown in FIG. 3 will now be described. Parts corresponding with those in FIG. 2 will be identified, where appropriate for the understanding of the invention, by corresponding reference numerals followed by a "b". The description below will center on the differences between the embodiments. In this embodiment, the crash box 4b has an open profile by providing the sidewall 8b lengthwise of the crash box 4b with a gap 22. The crash box 4b is comprised of two shell members 23, 24 which have overlapping vertical ends 25, 26 joined together to form the sidewall 7b.

The sidewall 8b also has a roof-shaped configuration and includes an upper wall section 12 and a lower wall section 13 which are each subdivided by diagonal edges 27, 28, respectively, into two wall surfaces 29, 30 of triangular or trapezoidal configuration, whereby the wall surfaces 29, 30 of each wall section 12, 13 are inclined at a different angle in relation to horizontal plane HM. Like crash box 4a, also crash box 4b has a vertical cross section that expands from the side rail proximal end 18 to the opposite end 19 proximal to the cross member 3.

The crash box 4c, shown in FIG. 4 will now be described. Parts corresponding with those in FIG. 3 will be identified, where appropriate for the understanding of the invention, by corresponding reference numerals followed by a "c". The crash box 4c differs from the crash box 4b merely by its construction in single-shell configuration, whereby the crash box 4c is made from suitably beveled metal sheet so that the sidewall 7c is smooth with no overlapping ends. In other aspects, the crash box 4c resembles the crash box 4b and thus has also an open profile with gap 22 formed in the sidewall 8c. For illustrative purposes, the wall surface 29 is shown here to have an angle of inclination which is greater than the angle of inclination of wall surface 29 of the crash box 4b. In other words, the angle of inclination of the wall surfaces 29, 30 can be suited to the situation at hand with respect to the overall configuration of the bumper 1.

A crash box 4 according to the present invention is so configured that the cross section in proximity of the cross member 3 is enlarged so that the crash box 4 can reliably be supported by the cross member 3. As is clearly illustrated in FIG. 1, the roof-shaped configuration of the sidewall 8 of each of the embodiments of crash box 4 is directed toward the adjacent free end 31 of the cross member 3. The crash box 4 is thus incorporated into the overall course of a crash and is quickly responsive for energy absorption and energy conversion in the event of a collision. This is true in particular in the event of a side crash. The roof-shaped configuration of thus outwardly projecting sidewall 8 points in the direction of a vehicle length side, i.e. in the direction of a side impact. As a consequence, the crash box 4 is able to absorb energy, in particular by way of the sidewall 8 which is directed towards a lateral force introduction. The cross member 3 is thus freed from exposure to stress so that the bumper 1 overall becomes more proficient. In particular at slow speeds of up to 4.9 km/h and oblique impact, damages to the bumper 1 and the vehicle body structure can thereby be prevented.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A bumper for a motor vehicle, comprising;
    a cross member disposed transversely in front of side rails of a motor vehicle frame; and
    a crash box located between the cross member and the side rails and configured from a metal sheet, said crash box having a sidewall comprised of plural inclined wall sections to form a roof-shaped sidewall, with a slanted gap extending lengthwise of the sidewall, wherein the slanted gap separates adjacent inclined wall sections.

2. The bumper of claim 1, wherein the crash box is of single-shell construction.

3. The bumper of claim 1, wherein the crash box has two shells connected to one another.

4. The bumper of claim 1, wherein the wall surfaces have each a triangular configuration.

5. The bumper of claim 1, wherein the wall surfaces have each a trapezoidal configuration.

6. The bumper of claim 1, wherein the crash box has a vertical cross section which increases from a side rail proximal end to a cross member proximal end.

7. The bumper of claim 1, wherein the sidewall of the crash box is directed to an adjacent end of the cross member.

* * * * *